(12) United States Patent
Chen

(10) Patent No.: US 11,346,988 B2
(45) Date of Patent: May 31, 2022

(54) MINIATURIZED OPTICAL CIRCULATOR

(71) Applicant: Peijuan Chen, Shanghai (CN)

(72) Inventor: Peijuan Chen, Shanghai (CN)

( * ) Notice: Subject to any disclaimer, the term of this patent is extended or adjusted under 35 U.S.C. 154(b) by 405 days.

(21) Appl. No.: 16/471,553

(22) PCT Filed: Nov. 17, 2017

(86) PCT No.: PCT/CN2017/111616
§ 371 (c)(1),
(2) Date: Jun. 19, 2019

(87) PCT Pub. No.: WO2018/113463
PCT Pub. Date: Jun. 28, 2018

(65) Prior Publication Data
US 2019/0391406 A1    Dec. 26, 2019

(30) Foreign Application Priority Data

Dec. 19, 2016 (CN) .......................... 201611176985.9
Dec. 19, 2016 (CN) .......................... 201621396439.1

(51) Int. Cl.
*G02B 5/30* (2006.01)
*G02B 27/28* (2006.01)
*G02B 6/27* (2006.01)

(52) U.S. Cl.
CPC ............. *G02B 5/30* (2013.01); *G02B 6/2706* (2013.01); *G02B 6/2746* (2013.01); *G02B 27/286* (2013.01); *G02B 27/283* (2013.01)

(58) Field of Classification Search
CPC .... G02B 27/283; G02B 27/286; G02B 27/28; G02B 6/2706; G02B 6/2746; G02B 6/42; G02B 3/10; G02B 5/30; G02F 1/09; G02F 1/03
See application file for complete search history.

(56) References Cited

FOREIGN PATENT DOCUMENTS

CN            204331200 U   *   5/2015

* cited by examiner

*Primary Examiner* — Darryl J Collins
*Assistant Examiner* — Tamara Y. Washington

(57) ABSTRACT

A miniaturized optical circulator includes: two polarized beam splitters and a 45-degree Faraday rotator, wherein an optical signal of a first optical path is input from a common terminal and is separated into a first polarization component and a second polarization component by a first polarized beam splitter, the first polarization component passes through the 45-degree Faraday rotator, reached a second polarized beam splitter and is reflected back, and passes through the 45-degree Faraday rotator and the first polarized beam, and reached a receiving terminal; the second polarization component under goes one reflection of the first polarization beam splitter subsequent to being separated, and reaches the receiving terminal; the optical signal of a second optical path is input, passes through the second polarized beam splitter, the 45-degree Faraday rotator, and the polarized beam splitter, and is output by the common terminal.

6 Claims, 3 Drawing Sheets

MINIATURIZED OPTICAL CIRCULATOR

CROSS REFERENCE OF RELATED APPLICATION

This is a U.S. National Stage under 35 U.S.C 371 of the International Application PCT/CN2017/111616, filed Nov. 17, 2017, which claims priority under 35 U.S.C. 119(a-d) to CN201611176985.9, filed Dec. 19, 2016; and to CN201621396439.1, filed on Dec. 19, 2016.

BACKGROUND OF THE PRESENT INVENTION

Field of Invention

The present invention relates to the field of optical fiber communication technology, and more particularly to a miniaturized optical circulator.

Description of Related Arts

Optical circulators are commonly utilized in optical communication systems and optical measurement systems. The optical circulator is a multi-port input-output non-reciprocal optic device that allows optical signals to be transmitted only sequentially along a specified port, i.e when an optical signal is input from a specified port, it can only be output from another specific port. If the output is not in the order of the specified port, the loss of the optical signal is very large, and the optical circulators have the effect of isolating optical signals.

Due to this transmission characteristic, the optical circulator is an important device in two-way communication, and can be used to separate the optical signals of forward transmission and reverse transmission in the same optical fiber, thereby achieving the purpose of single-fiber bidirectional communication.

In the conventional optical communication system, a large number of Ethernet optical modules adopt the same wavelength to receive the illuminating signal. Due to the lack of the miniaturized optical circulator, in order to cooperate with such a module, one must use two optical fibers to implement the same module separately. The receiving and transmitting functions of the medium optical signal cause a waste of a large amount of optical fiber resources.

A Chinese patent with a publication number of CN102364364A provides a typical optical circulator. As shown in FIG. 6, the optical circulator includes three ports of a transmitting terminal 1, a receiving terminal 3 and a common terminal 2, and an optical path comprising a first polarized beam splitter 41, a second polarized beam splitter 42, a third polarized beam splitter 43, and a reflection, a mirror 5, a half wave plate 6, a magnetic ring 7, a magnetic rotating sheet 8, and the like. The polarized beam is received from the transmitting terminal of the optical circulator through the first polarized beam splitter, the magnetic rotating optical sheet, the 22.5° half wave plate 9, and the second polarized beam splitter, and is received by the common terminal; the parallel direction polarized beam incident at the common end is subjected to the second polarized beam splitter, the magnetizer, the 22.5° ½ wave plate, the first polarized beam splitter, the 45° half-wave plate, and the third polarized beam splitter and are received by the receiving end; and the vertically polarized beam passes through the second polarized beam splitter, the mirror, the third polarized beam splitter and is then received by the receiving end. Due to the transmission characteristics of the optical circulator, the optical circulator can be integrated into the optical device to separate the optical signals of the forward transmission and the reverse transmission in the same optical fiber, thereby achieving the purpose of single-fiber two-way communication. The above conventional is a typical representative optical circulator solution, but such a commercial optical ring type is bulky, and is difficult to be integrated into the same small optical component, which hinders the market application of the device. In addition, the existing commercial optical circulators use more optical components, and the price is higher, which also limits their application.

SUMMARY OF THE PRESENT INVENTION

An object of the present invention is to provide a miniaturized optical circulator. The optical circulator of the present invention uses fewer optical components, is small in size, can be integrated into the same small optical component, and the cost is also greatly reduced, thereby solving the problems in the conventional optical circulator of many optical components, large volume, inconvenient integration, and high price.

Accordingly, in order to achieve the objects mentioned above, the present invention provides a miniaturized optical circulator, comprising: a port T1, a port T2, a port T3; (a common terminal, a receiving terminal, a transmitting terminal) and an optical component; wherein:

the optical component comprises a first polarized beam splitter, a 45-degree Faraday rotator, and a second polarized beam splitter;

when an optical signal is input from the port T1 (common terminal) and is output from the port T2 (receiving terminal) through the optical component, a first optical path is formed; and the optical signal of the first optical path passes through the first polarized beam splitter to be separated into a first polarization component and a second polarization component whose polarization directions are orthogonal to each other; wherein the first polarization component firstly passes through the 45-degree Faraday rotator and reaches the second polarized beam splitter to be reflected back by the second polarized beam splitter, and passes at least the 45-degree Faraday rotator and the first polarized beam splitter to reach the port T2 (receiving terminal); after being separated, the second polarization beam firstly passes through at least one reflection of the first polarized beam splitter to reach the port T2 (receiving terminal);

when the optical signal is input from the port T3 (transmitting terminal) and output from the port T1 (common terminal) through the optical component, a second optical path is formed; and the optical signal of the second optical path sequentially passes through the second polarized beam splitter, the 45-degree Faraday rotator and the first polarized beam splitter to be output by port T1 (the common terminal).

Preferably, the optical component further comprises a reflective polarization controller, wherein in the first optical path, the optical signal passes through the first polarized beam splitter to be separated into the first polarization component and the second polarization component whose polarization directions are orthogonal to each other; wherein the first polarization component passes through the 45-degree Faraday rotator and reaches the second polarized beam splitter to be reflected back by the second polarized beam splitter, and then passes through the 45-degree Faraday rotator again and the first polarized beam splitter to be output by the port T2 (receiving terminal); the second polarization beam passes through the reflective polarization controller to be reflected back, and then passes through the first polarized beam splitter to be output by the port T2 (receiving terminal).

Preferably, the optical component further comprises a reflective polarization controller, wherein in the first optical path, the optical signal passes through the first polarized to be separated into the first polarization component and the second polarization component whose polarization directions are orthogonal to each other; wherein the first polarization component passes through the 45-degree Faraday rotator and reaches the second polarized beam splitter to be reflected back by the second polarized beam splitter, and then passes through the 45-degree Faraday rotator to enter the first polarized beam splitter again to be reflected to enter the reflective polarization controller to be reflected back, and then passes through the first polarized beam splitter to be output by the port T2 (receiving terminal); the second polarization component is directly output from the port T2 (receiving terminal).

Preferably, both the first polarized beam splitter and the second polarized beam splitter are a polarized beam splitting film or a polarized beam splitting cube Preferably, the reflective polarization controller comprises an Nλ/4 waveplate and a reflector, wherein N is a natural number such as 1, 2, 3, 4, etc.; in the first optical path, the optical signal entered the input terminal of the reflective polarization controller passes through the Nλ/4 waveplate to be reflected back to the Nλ/4 waveplate by the reflector, and then passes through the Nλ/4 waveplate again to be output.

Preferably, the reflective polarization controller comprises a 45-degree Faraday rotator and a reflector, wherein in the first optical path, the optical signal entered the input terminal of the reflective polarization controller passes through the 45-degree Faraday rotator to be reflected back to the 45-degree Faraday rotator by the reflector, and then passes through the 45-degree Faraday rotator again to be output.

Preferably, the reflective polarization controller comprises a 45-degree Faraday rotator a polarized beam splitter, wherein in the first optical path, the optical signal entered the input terminal of the reflective polarization controller passes through the 45-degree Faraday rotator to be reflected back to the 45-degree Faraday rotator by the polarized beam splitter, and then passes through the 45-degree Faraday rotator again to be output.

Preferably, the reflector is a reflecting mirror.

Preferably, the miniaturized optical circulator comprises a plurality of beam-passing devices provided between the first polarized beam splitter and the reflective polarization controller; or provided in the reflective polarization controller; or between the first polarized beam splitter and the 45-degree Faraday rotator, or between the 45-degree Faraday rotator and the second polarized beam splitter.

Preferably, in the second optical path, the optical signal input is linearly polarized beam.

The miniaturized optical circulator of the present invention has the following advantages over the conventional art: the present invention greatly reduces the volume of the existing optical circulator, making it possible to integrate in a small optical component. Meanwhile, the components and processes adopted in the invention are extremely mature and low in cost.

DETAILED DESCRIPTION OF THE PREFERRED EMBODIMENT

Figure 1:
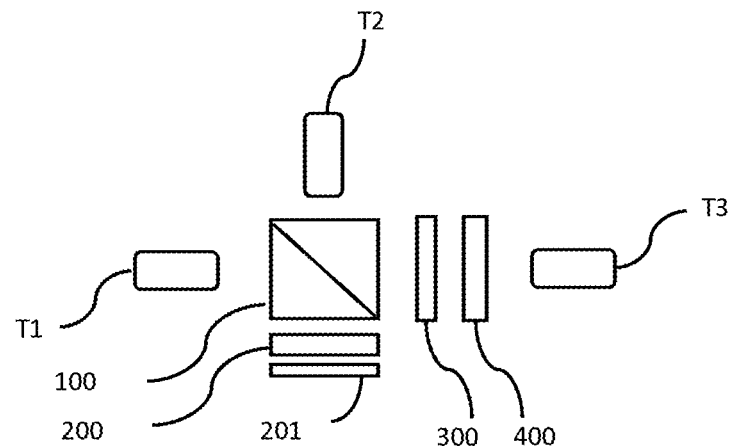
FIG. 1 is a schematic view of a single-fiber bidirectional transmission optical circulator of the present invention.

In order to further understand the objects, structural features and functions of the present invention, the following detailed description will be made with reference to the accompanying drawings. It should be understood that the specific embodiments described in this section are merely illustrative of the invention and are not intended to limit the invention.

A miniaturized optical circulator of the present invention comprises: a common terminal, a receiving terminal, a transmitting terminal, and an optical component comprising a first polarized beam splitter, a reflective polarization controller, a 45-degree Faraday rotator and a second polarized beam splitter.

The function of the first polarized beam splitter is to separate the optical signal into a first polarization component and a second polarization component whose polarization directions are orthogonal to each other (without loss of generality, which can be assumed to be p-polarized light) and a second polarization component (without loss of generality, which can be assumed to be s-beam)). The first polarized beam splitter can generally be made of a polarization beam splitting cube or a polarized beam splitting film; wherein the polarized beam splitting cube, also known as polarizing beam splitting prism, is made up of a pair of right-angled triangular prisms which are laminated. A laminating surface is coated with a polarization beam splitting dielectric film, which can split incident un-polarized beam into two vertical linearly polarized beams (p-polarized light and s-polarized light). In a preferred embodiment, the p-polarized light passes completely, while the s-beam is reflected at an angle of 45 degrees, an exit direction of the s-beam is at an angle of 90 degrees to the p-polarized light, and the polarization directions of the p-polarized light and s-polarized light are orthogonal to each other.

The function of the reflective polarization controller is to change the polarization direction of the incident beam polarization and reflect the incident beam, so that the polarization direction of the reflected beam is orthogonal to the original incident polarization direction by 90 degrees, and the reflective polarization controller is generally made of a λ/4 waveplate and a mirror.

Here, those skilled in the art should understand that the λ/4 waveplate can be replaced by any Nλ/4 waveplate wave plate such as λ/2 wave plate, 3λ/4 wave plate, etc., where N is a natural number such as 1, 2, 3, 4 . . . . The λ/4 wave plate can also be replaced by a 45-degree Faraday rotator.

When the 45-degree Faraday rotator is utilized for the reflective polarization controller, the reflecting mirrors in the assembly can be replaced by polarized beam splitters.

The function of the second polarized beam splitter is to transmit a certain polarization component and reflect an orthogonal component thereof. The second polarized beam splitter generally comprises a polarized beam splitter, preferably a coating type polarized beam splitter. The polarization reflecting direction and the first polarization component are at an included angle of 45 degrees (either by clockwise or counterclockwise, without loss of generality, in the present invention, by a clockwise angle).

Referring to FIG. 1, in the miniaturized optical circulator of the present invention, a port T1 is a common terminal, a port T2 as a receiving terminal, and a port T3 is a transmitting terminal. When an optical signal is input from the port T1 and output through the optical component from the port T2, a first optical path is formed, i.e., the optical signal entering the port T1 passes through the first optical path and is output at the port T2. When the optical signal is input from the port T3, passes through the optical component and is output from the port T1, it is configured as a second optical path, i.e., the optical signal entering the port T3 passes through the second optical path and is output at the port T1. It should be understood by those skilled in the art that in the working state of the optical circulator, the first optical path and the second optical path can coexist simultaneously.

Figure 2:
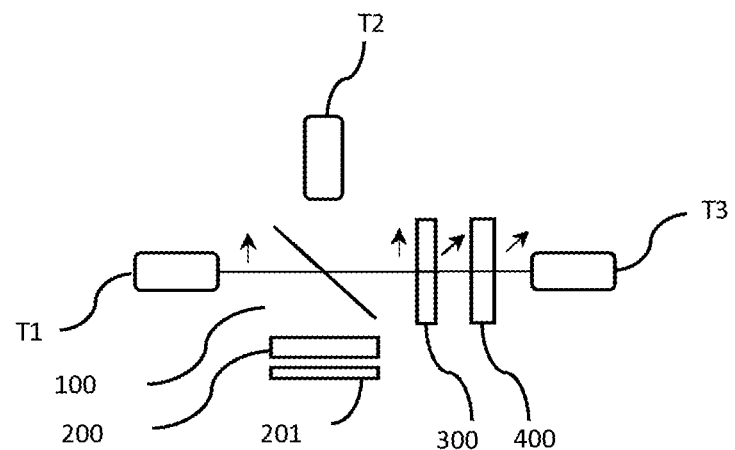
FIG. 2 is a schematic diagram of an optical signal transmitted from a port T3 to a port T1 according to a first embodiment of the present invention.

FIG. 2 shows the second optical path according to a preferred embodiment of the present invention. In the second optical path, the optical signal input is linearly polarized beam, and a polarization direction of the linearly polarized beam input is consistent with a transmission direction of the second polarized beam splitter 400. After the optical signal sequentially passes through the second polarized beam splitter 400 and the 45-degree Faraday rotator 300 via the port T3, a polarization direction is deflected by 45 degrees, and becomes polarized with the first polarization component (p-polarized light), so as to be capable of passing through a first polarized beam splitter 100 to be output from the port T1.

Figure 3:
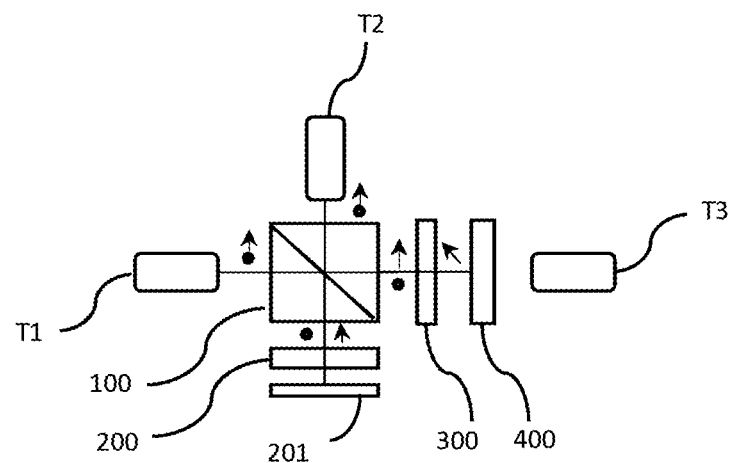
FIG. 3 is a schematic diagram of the optical signal transmitted from the port T1 to a port T2 according to the first embodiment of the present invention.

As shown in FIG. 3, in the first optical path, the optical signal input by the port T1 passes through the first polarized beam splitter 100, and is separated into a first polarization component (p-polarized light) and a second polarization component (s-polarized light) whose polarization directions are orthogonal to each other, the second polarization component is reflected into a λ/4 waveplate 200, passes through the λ/4 waveplate 200 and is reflected back by the reflector 201. After passing through the λ/4 waveplate 200 again, a polarization direction of the emergent optical signal is deflected by 90 degree (becomes p-polarized light), transmitted through the first polarized beam splitter 100 and output from the port T2; the first polarization component enters the 45-degree Faraday rotator 300 then is reflected back by the second polarized beam splitter 400 to pass through the 45-degree Faraday rotator 300 again; the polarization direction of the emergent optical signal is also deflected by 90 degrees (becomes s-polarized light), reflected by the first polarized beam splitter 100, and output by the port T2. Here, those skilled in the art should understand that the reflector 201 may adopt a total reflection lens or a highly reflective metal film or a multilayer dielectric film.

In the above structure, the reflective polarization controller is made of the λ/4 waveplate 200 and the reflector 201, and a 45-degree Faraday rotator can be used instead of the λ/4 waveplate 200 to manufacture a reflective polarization controller. When the 45-degree Faraday rotator is used in a reflective polarization controller, the reflecting mirrors in the assembly can be replaced by polarized beam splitters. After the linearly polarized beam passes through the 45-degree Faraday rotator twice, the emergent optical signal is rotated by 90 degrees with respect to the polarization direction of the incident optical signal.

Meanwhile, those skilled in the art should understand that the λ/4 waveplate can be replaced by any Nλ/4 waveplate such as λ/2 waveplate, 3λ/4 waveplate, etc., wherein N is a natural number such as 1, 2, 3, 4 . . . .

For example, according to a preferred embodiment, a ½ wave plate is adopted to replace the λ/4 wave plate, and the reflector at this time is a corner reflector. The optical axis of the ½ wave plate is at an angle of 45 degrees to the direction of polarization of the incident linearly polarized beam. The corner reflector reverses a direction of the incident optical signal, but an angle is constant, and the corner reflector can be fabricated using two full-reflection lenses with a right angle. When the linearly polarized beam passes through the ½ wave plate, the polarization direction is rotated by 90 degrees, and then emitted by the two reflections of the corner reflector, and the emergent beam is opposite to the incident beam. However, the ½ wave plate acts only once, so that the emergent optical signal is rotated by 90 degrees relative to the polarization direction of the incident optical signal.

In another preferred embodiment, a 3λ/4 wave plate is adopted to replace the λ/4 wave plate. The reflector can be a total reflection lens or a highly reflective metal film or a multilayer dielectric film. The incident linearly polarized beam is reflected by the reflector after passing through the 3λ/4 wave plate, and after passing through the 3λ/4 wave plate again, the polarization direction of the emergent optical signal is deflected by 90 degrees.

Figure 4:
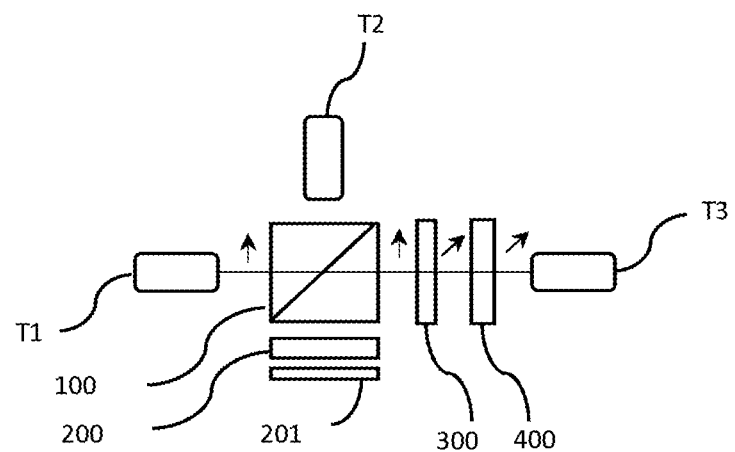
FIG. 4 is a schematic diagram of an optical signal transmitted from the port T3 to the port T1 according to a second embodiment of the present invention.
Figure 5:
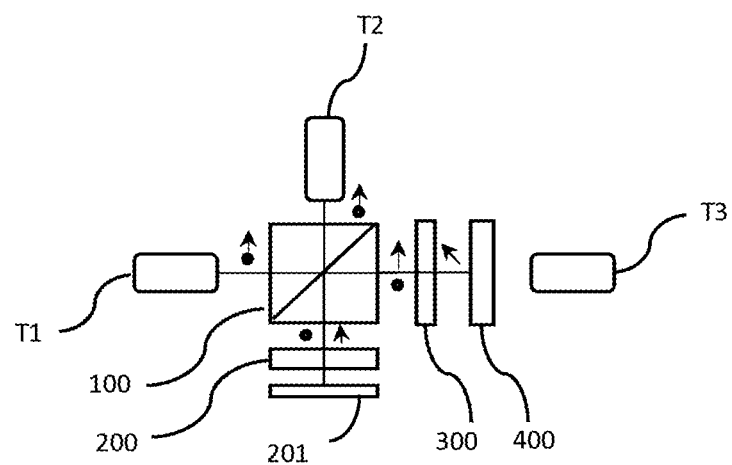
FIG. 5 is a schematic diagram of an optical signal transmitted from the port T1 to the port T2 according to the second embodiment of the present invention.
Figure 6:
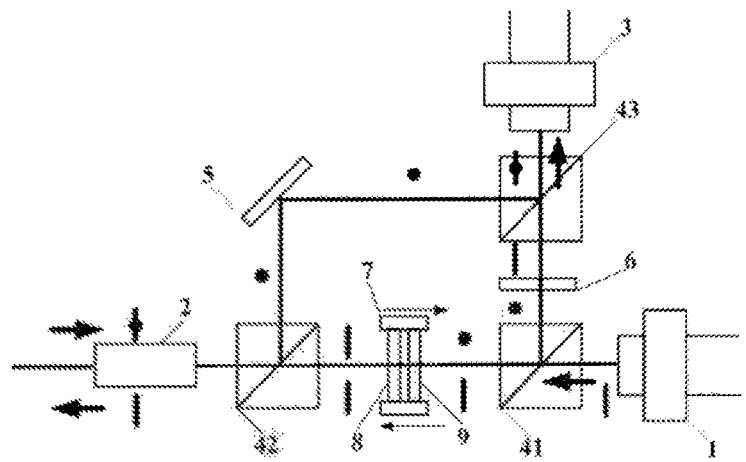
FIG. 6 is a schematic diagram of the optical circulator in a prior art.

FIG. 4 and FIG. 5 respectively show transmission paths of the first optical path and the second optical path according to another preferred embodiment, which differs from the previous embodiment in that a placement of the first polarized beam splitter and a placement in the preferred embodiment 1 deflect by 90 degrees, correspondingly, the first optical path changes.

As shown in FIG. 4, in the second optical path, the linearly polarized beam input is sequentially output from the port T1 via the second polarized beam splitter 400, the 45-degree Faraday rotator 300, and the first polarized beam splitter 100 through the port T3.

As shown in FIG. 5, in the first optical path, the optical signal input by the port T1 passes through the first polarized beam splitter 100, and is separated into a first polarization component (p-polarized light) and a second polarization component (s-polarized light) whose polarization directions are orthogonal to each other, the second polarization component is reflected and is output from the port T2. The first polarization component passes through the 45-degree Faraday rotator 300 and is reflected by the second polarized beam splitter 400, then passes through the 45-degree Faraday rotator 300 again to enter the first polarized beam splitter 100 back again; at the moment, the polarization direction of the first polarization component is deflected by 90 degrees (s-polarized light), reflected into the λ/4 wave plate 200, reflected back by the reflector 201 to the λ/4 wave plate 200 again, and after passing through the λ/4 wave plate 200 again, the direction of the first polarization component is polarized again by 90 degrees (p-polarized light), which is also output by the port T2 after being transmitted through the first polarized beam splitter 100.

In the structure of FIG. 5 mentioned above, the reflective polarization controller is made up of the λ/4 wave plate 200 and the reflector 201. It should be understood by those skilled in the art that the reflective polarization controller can also be replaced by a 45-degree Faraday rotator to replace the λ/4 wave plate 200. When the 45-degree Faraday rotator is used for the reflective polarization controller, the reflecting mirror in the assembly can be replaced by a polarized beam splitter. After the linearly polarized beam passes through the 45-degree Faraday rotator twice, the emergent optical signal is rotated by 90 degrees relative to the polarization direction of the incident optical signal.

In conventional optical communication systems, since some applications require a higher transmission rate, the optical communication systems are very sensitive to the signal delay of the first polarization component and the second polarization component of the transmitted optical signal. In order to solve the problem of signal delay, the miniaturized optical circulator of the present invention is provided with a plurality of beam-passing devices, and the optical path of the first polarization component or the second polarization component can be changed by setting the beam-passing device so that their optical path is maintained consistently, the effects of signal delay caused by the original optical path are eliminated.

The beam-passing device generally comprises a non-conductive medium flat sheet, and a typical beam-passing device has a glass body, a silicon wafer or the like with various refractive indices. The beam-passing devices may be disposed between the first polarized beam splitter and the reflective polarization controller or inside the reflective polarization controller; or may be disposed between the first polarized beam splitter and the 45-degree Faraday rotator or between the 45-degree Faraday rotator and the second polarized beam splitter.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A miniaturized optical circulator, comprising: a common terminal, a receiving terminal, a transmitting terminal and an optical component; wherein:

the optical component comprises a first polarized beam splitter, a 45-degree Faraday rotator, and a second polarized beam splitter;

when an optical signal is input from the common terminal and is output from the receiving terminal through the optical component, a first optical path is formed; and the optical signal of the first optical path passes through the first polarized beam splitter to be separated into a first polarization component and a second polarization component whose polarization directions are orthogonal to each other; wherein the first polarization component firstly passes through the 45-degree Faraday rotator and reaches the second polarized beam splitter to be reflected back by the second polarized beam splitter, and passes at least the 45-degree Faraday rotator and the first polarized beam splitter to reach the receiving terminal; after being separated, a second polarization beam firstly passes through at least one reflection of the first polarized beam splitter to reach the receiving terminal;

when the optical signal is input from the transmitting terminal and output from the common terminal through the optical component, a second optical path is formed; and the optical signal of the second optical path sequentially passes through the second polarized beam splitter, the 45-degree Faraday rotator and the first polarized beam splitter to be output by the common terminal;

wherein both the first polarized beam splitter and the second polarized beam splitter are a polarized beam splitter film or a polarized beam splitting cube;

wherein the reflective polarization controller comprises an N λ/4 wave plate and a reflector, wherein N is a natural number such as 1, 2, 3, 4, etc.; in the first optical path, the optical signal entered the input terminal of the reflective polarization controller passes through the N λ/4 wave plate to be reflected back to the N λ/4 wave plate by the reflector, and then passes through the N λ/4 waveplate again to be output.

2. The miniaturized optical circulator, as recited in claim 1, wherein the reflector is a reflecting mirror.

3. The miniaturized optical circulator, as recited in claim 1, wherein the miniaturized optical circulator comprises a plurality of beam-passing devices provided between the first polarized beam splitter and the reflective polarization controller; or provided in the reflective polarization controller; or between the first polarized beam splitter and the 45-degree Faraday rotator, or between the 45-degree Faraday rotator and the second polarized beam splitter.

4. The miniaturized optical circulator, as recited in claim 1, wherein in the second optical path, the optical signal input is linearly polarized beam.

5. A miniaturized optical circulator, comprising: a common terminal, a receiving terminal, a transmitting terminal and an optical component; wherein:

the optical component comprises a first polarized beam splitter, a 45-degree Faraday rotator, and a second polarized beam splitter;

when an optical signal is input from the common terminal and is output from the receiving terminal through the optical component, a first optical path is formed; and the optical signal of the first optical path passes through the first polarized beam splitter to be separated into a first polarization component and a second polarization component whose polarization directions are orthogonal to each other; wherein the first polarization component firstly passes through the 45-degree Faraday rotator and reaches the second polarized beam splitter to be reflected back by the second polarized beam splitter, and passes at least the 45-degree Faraday rotator and the first polarized beam splitter to reach the receiving terminal; after being separated, a second polarization beam firstly passes through at least one reflection of the first polarized beam splitter to reach the receiving terminal;

when the optical signal is input from the transmitting terminal and output from the common terminal through the optical component, a second optical path is formed; and the optical signal of the second optical path sequentially passes through the second polarized beam splitter, the 45-degree Faraday rotator and the first polarized beam splitter to be output by the common terminal;

wherein both the first polarized beam splitter and the second polarized beam splitter are a polarized beam splitter film or a polarized beam splitting cube;

wherein the reflective polarization controller comprises a 45-degree Faraday rotator and a reflector, wherein in the first optical path, the optical signal entered the input terminal of the reflective polarization controller passes through the 45-degree Faraday rotator to be reflected back to the 45-degree Faraday rotator by the reflector, and then passes through the 45-degree Faraday rotator again to be output.

6. A miniaturized optical circulator, comprising: a common terminal, a receiving terminal, a transmitting terminal and an optical component; wherein:

the optical component comprises a first polarized beam splitter, a 45-degree Faraday rotator, and a second polarized beam splitter;

when an optical signal is input from the common terminal and is output from the receiving terminal through the optical component, a first optical path is formed; and the optical signal of the first optical path passes through the first polarized beam splitter to be separated into a first polarization component and a second polarization component whose polarization directions are orthogonal to each other; wherein the first polarization component firstly passes through the 45-degree Faraday rotator and reaches the second polarized beam splitter to be reflected back by the second polarized beam splitter, and passes at least the 45-degree Faraday rotator and the first polarized beam splitter to reach the receiving terminal; after being separated, a second polarization beam firstly passes through at least one reflection of the first polarized beam splitter to reach the receiving terminal;

when the optical signal is input from the transmitting terminal and output from the common terminal through the optical component, a second optical path is formed; and the optical signal of the second optical path sequentially passes through the second polarized beam splitter, the 45-degree Faraday rotator and the first polarized beam splitter to be output by the common terminal;

wherein both the first polarized beam splitter and the second polarized beam splitter are a polarized beam splitter film or a polarized beam splitting cube;

wherein the reflective polarization controller comprises a 45-degree Faraday rotator and a polarized beam splitter, wherein in the first optical path, the optical signal entered the input terminal of the reflective polarization controller passes through the 45-degree Faraday rotator to be reflected back to the 45-degree Faraday rotator by the polarized beam splitter, and then passes through the 45-degree Faraday rotator again to be output.

* * * * *